United States Patent [19]

Shook

[11] 4,285,330
[45] Aug. 25, 1981

[54] CONCENTRATING SOLAR COLLECTOR

[76] Inventor: Wayne A. Shook, Rte. 2, Box 34, Marissa, Ill. 62257

[21] Appl. No.: 103,377

[22] Filed: Dec. 13, 1979

[51] Int. Cl.³ .............................................. F24J 3/02
[52] U.S. Cl. .................................. 126/425; 126/438; 126/443; 126/449
[58] Field of Search ............. 126/901, 449, 438, 439, 126/443, 424, 425; 165/133

[56] References Cited

U.S. PATENT DOCUMENTS

| | | | |
|---|---|---|---|
| 1,575,309 | 3/1926 | Anderson | 126/443 |
| 2,608,968 | 9/1952 | Moseley | 126/449 |
| 3,348,374 | 10/1967 | Schalkowsky | 126/438 |
| 4,011,855 | 3/1977 | Eshelman | 126/438 |
| 4,059,093 | 11/1977 | Knowles et al. | 126/443 |
| 4,074,678 | 2/1978 | Posnansky | 126/443 |
| 4,129,119 | 12/1978 | Yoke | 126/438 |
| 4,142,510 | 3/1979 | Hare et al. | 126/438 |
| 4,184,895 | 1/1980 | Oster | 126/438 |
| 4,186,725 | 2/1980 | Schwartz | 126/443 |
| 4,220,136 | 9/1980 | Penney | 126/438 |

Primary Examiner—Daniel J. O'Connor

[57] ABSTRACT

In a concentrating solar collector, a plurality of pivotally-mounted, elongated, side-adjacent parabolic reflectors are inclined toward the sun by a tracking device to focus incident sunlight on a plurality of parallel, spaced-apart, blackened stripes on a lengthwise extending water pipe absorber, whose outer surface is otherwise of low thermal emittance. Because the absorber has a relatively small area of high emittance, namely the combined area of the striped segments, it radiates less heat than if it were totally blackened. The temperature of the absorber at the stripes is not substantially greater than at the shiny areas between, due to the high thermal conductivity of the absorber pipe and the moderating effect of the water within it. Thus, the absorber has a lower emittance of thermal radiation than a totally blackened absorber, without a corresponding decrease in absorptance of sunlight.

1 Claim, 3 Drawing Figures

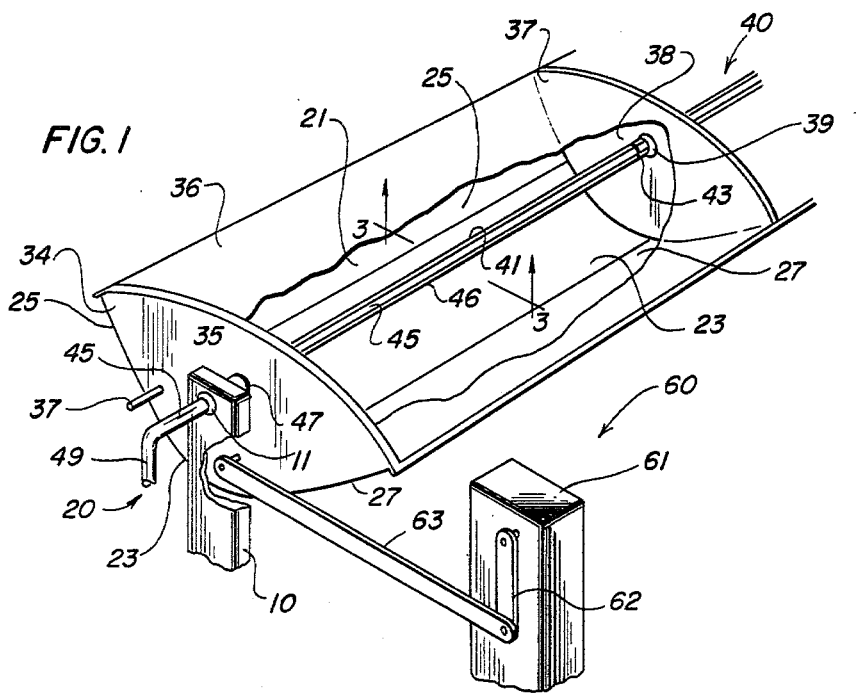

CONCENTRATING SOLAR COLLECTOR

BACKGROUND OF THE INVENTION

The present invention relates to solar collectors, particularly of the type in which an arcuate mirror focuses incident sunlight on a tubular absorber.

It is well known that a solar collector may be constructed by providing the combination of an arcuate mirror aimed toward the sun by a tracking device and an absorber upon which the mirror is focused; for example, a long mirror of parabolic cross-section together with a blackened smaller diameter water pipe. This is found to be relatively inefficient; losses are caused by the hot black-body absorber radiating thermal energy at a rate proportionate to its hot outer surface temperature, and conducting heat to the air passing over it. The conduction losses may be lessened greatly by providing a glass vacuum tube about the absorber pipe.

Even more refined versions of such a system utilize an enveloping vacuum tube having a silvered surface, except for "windows" which admit the light focused upon the absorber tube. The absorber pipe may be provided with a selective surface coating by which its absorptance of sunlight is an order of magnitude greater than its emittance of thermal radiation. These refinements are extraordinarily expensive and may have a short lifetime due to the extreme temperature.

SUMMARY OF THE INVENTION

The primary purpose of the present invention is to provide a focusing-mirror type concentrating solar collector which is relatively inexpensive and has a long usable life.

Briefly summarized, the present invention comprises a plurality of elongated reflectors or mirrors having cross-sections describing parabolic portions mounted to focus incident sunlight on a tubular water-conducting absorber extending lengthwise and having a glass vacuum tube cover to reduce conduction losses and oxidation of the absorber surface. The absorber pipe, of a shiny metal having a high thermal conductivity and low emittance of heat, preferably copper or aluminum, has a narrow lengthwise black stripe for each reflector, whereby the sunlight incident on each reflector is focused on its corresponding black stripe. A tracking mechanism pivots the reflectors so that each is constantly focused on its absorber stripe. The heat generated at the black stripes is transmitted to the water within the absorber, as well as being conducted around the circumference of the pipe, due to its high thermal conductivity. The absorber, at a relatively high temperature, radiates heat energy, but the shiny metal portions of the tube between the stripes have a low emittance, so that only the stripes, a relatively small portion of the absorber pipe outer surface, radiate energy at a rapid rate. Since the stripes are not at a substantially higher temperature than a corresponding totally blackened surface of a conventional absorber tube of the same diameter, the total radiation loss is substantially decreased. This construction provides an absorber having an extremely low emittence of thermal radiation without the usual corresponding decrease in absorptance of sunlight.

Brief Description of the Drawings

FIG. 1 is a perspective view of a concentrating solar collector embodying the present invention.

FIG. 2 is a schematic end view of the reflector and absorber of the collector of FIG. 1, showing the path of sunlight incident on the reflector.

FIG. 3 is an enlarged fragmentary view of the lower side of the absorber as taken along line 3—3 of FIG. 1.

Description of the Preferred Embodiment

Described in detail, the present invention is comprised of pivot mount structures 10, a reflector assembly, generally designated 20, an absorber assembly, generally designated 40, and a tracking device, generally designated 60 and shown schematically. Sunlight incident on the reflector assembly 20 is focused upon the absorber assembly 40 by pivoting the reflector and absorber assemblies 20, 40 on the pivot mount structure 10, by the tracking device 60.

As shown schematically in FIG. 1, the pivot mount structure 10 may be any sturdy structure which will serve to support the weight of the reflector and absorber assemblies 20, 40 for pivoting. As shown, the structure 10 has an upper bore 11 with a bushing, not shown, which accepts the absorber assembly 20 for pivoting. One such pivot mount structure 10 will be required at each end of the reflector assembly 20.

The reflector assembly 20 is made up of a shiny aluminum sheet 21 having three portions forming three side-adjacent reflectors, each having a cross-section which substantially defines a portion of a parabola. As shown in FIG. 2, the center reflector 23 has its parabola axis 24 pass through its center, the left reflector 25 has its parabola axis 26 pass through the center reflector 23 parallel to the center reflector axis 24, and the right reflector 27 has its parabola axis 28 pass through the center reflector 23 parallel to the center and left reflector axes 24, 26. Thus, the aluminum sheet 21 forms three parabolic reflectors with parallel axes.

As shown by the dashed lines in FIG. 2, the center reflector 23 focuses its incident sunlight along a line of focus or concentration designated in FIG. 2 by the point marked 29, while the left reflector 25 focuses similarly along the line designated by the point 30 and the right reflector focuses along that line designated by the point 31. It will be understood that the lines of focus or concentration will have a finite width due to inaccuracies in the reflectors and the tracking mechanism 60.

The reflector assembly 20 has, at each end, an end plate 34 of a suitably strong material to support the aluminum sheet 21 in the parabolic shapes required for proper focusing. Each end plate 34 has a centrally located bore 35, at the foci of the reflector parabolas, to receive the absorber assembly and a curved upper end to support a translucent plastic cover 36. A pressure-relief vent 37 is also preferably included in the end plate 34. Spaced between its ends, the reflector assembly 20 has an intermediate support plate 38, similar to the end plates 34, having a central bore 39 to accept the absorber assembly 40.

The absorber assembly 40 is comprised of a translucent glass vacuum tube or envelope 41 within which is mounted a liquid-conducting absorber tube 45, such as a 1 inch O.D. copper water pipe. Spring-like copper spacers 43 fixed to the absorber tube 45 mount it centrally within the vacuum tube 41. The absorber tube 45 extends outwardly of the ends of the vacuum tube 41;

these ends are sealed by an expansion joint, in the preferred embodiment formed by flexible sealant 44 applied about a ring of substantially frictionless tape 42 on the absorber tube 45 at the end of the vacuum tube 41.

The absorber tube 45 has a generally reflective or shiny outer surface whereby it will have a low coefficient of emittance for thermal radiation, also known as infrared or longwave thermal radiation. For best results, the emittance for thermal radiation of this portion of the outer surface of the absorber tube 45 should not exceed one-tenth that of a perfect blackbody. An emittance of less than four-tenths is preferable, though any emittance less than that of the absorber's blackened stripes, described below, may be beneficial. The absorber tube 45 is further characterized by a substantial heat conductivity, the thermal conductivity of copper being the highest of any material which is practical in this use. Preferably, the thermal conductivity should not be less than that of aluminum; materials of lower thermal conductivity, such as steel or galvanized iron, may be utilized with lessened efficiency.

The shiny outer surface of the absorber tube 45 is interrupted by a plurality of elongated parallel spaced-apart stripe-like portions or areas 46 described along line of focus or concentration whose spacing corresponds to that of the points 29, 30, 31 of the cross-sectional view FIG. 2. These stripe-like portions 46 are blackened, as shown in FIG. 3, one stripe-like portion 46 corresponding to each of the reflectors 23, 25, 27. The stripe-like portions are, for the 1 inch O.D. pipe of this embodiment, each approximately 0.3 inch wide. For best results, the total of the blackened areas 46 should not exceed one-third of the total outer surface area of the absorber tube 45, and in no case should it exceed one-half. The blackened areas preferably have a coefficient of absorptance not less than eight-tenths that of a perfect blackbody. The term "blackened" in this sense does not specifically mean the coloration of the stripe-like portions 46, but rather refers to darkening of those areas to maximize the absorptance of sunlight. The darkened areas may be painted on, or for greater efficiency, provided with a selective absorbing coating, such as those commercially available which have a ratio of absorptance for sunlight to emittance for thermal radiation of not less than five.

The ends of the absorber tube 45 outward of the vacuum tube 41 extend through the bores 35 in the reflector assembly end plates 34, at which the absorber tube 45 is fixed by a seal 47 to the end plates 34, whereby angular rotation of the reflector assembly 20 by the tracking device 60 similarly rotates the absorber assembly 40. The vacuum tube 41, with its inner absorber tube 45, passes through the bore 39 in the intermediate support plate 38.

The tracking device 60, shown in schematic form in FIG. 1, is made up of a clocking device 61 set to complete one rotation of a crank arm 62 during a 24-hour interval. The crank arm 62 is tied by a linkage 63 to an end plate 34 of the reflector assembly 20. By proper orientation and adjustment of these elements the parallel axes 24, 26, 28 of the three reflectors 23, 25, 27 are always inclined substantially toward the sun, so that (disregarding azimuth angle) sunlight incident on each reflector is parallel to its axis and is thus reflected to its line of focus. Therefore, regardless of the position of the sun in the daylight sky, the sunlight incident upon reflectors is focused upon their respective stripe-like portions 46, each at a line of focus 29, 30, 31. It will be obvious that a more complex tracking device which adjusts its azimuth angle may be substituted, with increased efficiency.

In actual use, the opposite end of the vacuum tube 41 (not shown) is also sealed and the vacuum tube 41 is maintained substantially evacuated. If desired, a small tube whose outer end is capped may extend through the seal, to permit periodic re-evacuation of the tube 41 as may be necessary. Longitudinally outward of the pivot mount structure 10, the absorber tube 45 is flexibly connected by external tubing 49 to apparatus which extracts heat from the heated liquid and pumps the cooled liquid to the absorber tube 45 where it again is heated.

In operation of the present concentrating solar collector, the apparatus is positioned with the reflector assembly 20 on substantially a north-south axis; for installation in the northern hemisphere, the pivot mount structure 10 at the north end may be raised somewhat so that the assembly faces the southern sun. The tracking device clock 61 is properly set so that the parallel axes 24, 26, 28 of the three reflectors 23, 25, 27 are thus inclined substantially toward the sun as it changes its position during the daylight hours. By so positioning the reflectors, they concentrate the light incident upon them on the narrow sunlight-absorbing stripe-like portions 46 of the absorber tube 45.

The sunlight focused upon the stripe-like portions 46 heats the absorber tube 45 at the lines of focus, 29, 30, 31. Because of the high thermal conductivity of the absorber tube 45, the heat is transmitted to the water flowing within, as well as circumferentially about, the absorber tube 45, so that the absorber temperature is substantially that of a conventional totally blackened absorber tube of the same size, and approximately uniform about the circumference of the absorber. While the shiny portions of the absorber tube 45 radiate only a small amount of thermal energy, the blackened stripe-like portions 46 radiate energy at substantially the same rate per unit area as such a conventional absorber of the same size. Since the stripe-like portions 46 comprise only a limited portion of the outer surface of the tube 45, the total absorber tube emits only a fraction of the thermal radiation which would be emitted by an absorber tube which was blackened over its entire outer surface. The absorber functions similarly to a conventional absorber of a smaller diameter with resulting higher optical gain, but without the usual drawbacks of inadequate flow of transfer fluid through the absorber or sag of the absorber tube under its own weight.

This leads to many advantages in construction and operation. For example, the absorber tube may be made of a larger diameter than would otherwise be practical, because of the reduced emission; this affords greater strength to the tube, so that fewer supports are required. Its greater diameter affords a larger conduction surface in contact with the transfer fluid and a larger area through which the fluid may flow. These factors decrease the required flow rate and pressure drop across the absorber tube which affords a smaller circulating pump. The use of a smaller pump uses less energy and thereby increases total system efficiency.

The present invention is not limited to the specific embodiment described above; other constructions will be apparent to persons skilled in the art. For example, the reflectors may be of any practical reflecting material and of any shape which concentrates incident sunlight to a line of concentration. This may be achieved by curves other than parabolas, by a large plurality of flat, slat-like mirrors arranged in a parabolic arc, or by a deep parabola, known as a crab-eye collector, whic directs all sunlight which enters its aperture to the inner end of the parabola, at which point an absorber tube is mounted. Other forms of tracking means, such as light sensing mechanisms, may be utilized to position the reflectors relative to the sun so that the sunlight incident on each reflector is reflected to its line of focus or concentration. The absorber tube may be any tubular fluid-conducting device as for carrying water, anti-freeze or air. From these examples, other modifications will suggest themselves.

I claim:

1. A concentrating solar collector for use in heating liquid, comprising a plurality of elongated side-adjacent sunlight reflectors, each having a cross-sectional portion defining a portion of a parabola, each reflector having a line of focus, tracking means to so position the reflectors relative to the sun that the sunlight incident on each reflector is reflected to its line of focus, and a tubular liquid-conducting absorber mounted with its outer surface substantially along the line of focus of the elongated reflector, the absorber being surrounded by a substantially translucent, substantially evacuated tubular cover, the absorber characterized by having thermal conductivity not less than that of aluminum, and an outer surface which generally has a coefficient of emittance for thermal radiation of not more than four-tenths that of a perfect blackbody, interrupted by a plurality of elongated parallel spaced-apart stripe-like areas extending longitudinally along its outer surface, one at the line of focus of each reflector, the stripe-like areas having a coefficient of absorptance not less than eight-tenths that of a perfect blackbody, whereby to minimize emittance of thermal radiation from the absorber without a corresponding decrease in absorptance of sunlight wherein the combined surface areas of said plurality of elongated stripe-like areas of the absorber outer surface together do not exceed one-third of the total outer surface area of the absorber, the elongated stripe-like areas of the absorber outer surface having a selective absorbing coating having a ratio of absorptance for sunlight to emittance for thermal radiation of not less than five, and wherein the reflective surfaces of the plurality of elongated side-adjacent sunlight reflectors are together formed of a single sheet of reflecting material.

* * * * *